Jan. 21, 1969   D. E. WEYER   3,422,855
HIGH TEMPERATURE FLUID CONDUIT
Filed Nov. 17, 1965
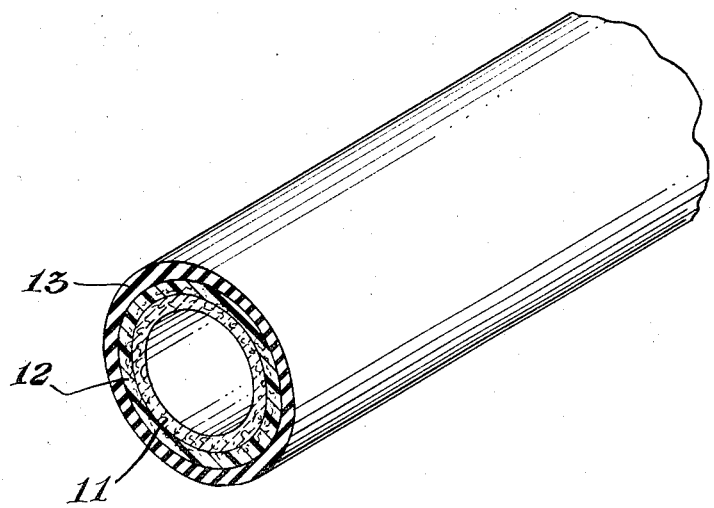
INVENTOR.
Donald E. Weyer
BY
ATTORNEY

United States Patent Office 3,422,855
Patented Jan. 21, 1969

3,422,855
HIGH TEMPERATURE FLUID CONDUIT
Donald E. Weyer, Midland, Mich., assignor to Dow Corning Corporation, Midland, Mich., a corporation of Michigan
Filed Nov. 17, 1965, Ser. No. 508,210
U.S. Cl. 138—141        3 Claims
Int. Cl. F16l 11/04

ABSTRACT OF THE DISCLOSURE

Conduit such as an automobile exhaust duct or muffler made of a silicone resin-inorganic fiber composite, at least the inner portions of which are ceramified. Any unceramified portions of the silicone resin consist of between 2 and 60 percent by weight of the fiber-resin composite in the unceramified portion, the residual silica in the ceramified portion being between 1 and 20 percent by weight after ceramification. Additionally, the conduit may be encased in a silicone rubber jacket.

---

This invention relates to a method of making tubular conduits and to the conduits produced thereby, and more particularly to conduits suitable for gas or liquid flow under high temperature conditions.

In the field of automotive exhaust systems it has been a common practice to provide metallic conduits and mufflers for conducting the exhaust gases from the internal combustion engines to the rear of the automobile. This type of system has numerous inherent disadvantages. In the first place, the metallic conduits are subject to chemical attack by the exhaust gases and by various chemicals which are placed on the roads for the melting of snow and other purposes. To remedy this difficulty, various types of coatings have been applied to exhaust systems but none have proved to be completely satisfactory. A further difficulty encountered with present-day types of exhaust systems is the fact that each type of automobile requires a different shaped exhaust conduit. This entails stocking many different shapes of replacement pipes and mufflers creating a large storage and inventory problem.

An object of the present invention, therefore, is to provide an exhaust conduit for automotive use which is free of the aforementioned disadvantages.

More specifically it is an object of the present invention to provide a conduit for high temperature gases or liquids, which is resistant to chemical corrosion.

Another object is to provide an automotive exhaust conduit construction which may be used on various types of automobiles.

In accordance with these and other objects there is provided by the present invention a conduit for hot gases and liquids which comprises a fibrous material capable of withstanding high temperatures and which is impregnated with a silicone resin. The silicone resin in the innermost portion of the conduit is ceramified to provide thermal insulation, structural rigidity and to act as a bonding medium for the fibrous material to prevent erosion thereof. If desired, an elastomeric coating of silicone or other material may be provided over the resin impregnated fiber as additional insulation and protection against damage by external forces such as stones or the like when the conduit is used in an automotive exhaust system. The conduit thus formed has application not only in automotive exhaust systems but also in aircraft duct work, other internal combustion engine exhaust systems and many industrial ventilation systems, among other applications. The conduits so formed are resistant to chemical attack and are sufficiently flexible so that they may be bent to any desired shape to fit different types of installations.

Other objects and attendant advantages of this invention will become obvious to those skilled in the art from the consideration of the following detailed description when considered in connection with the accompanying drawing, the sole figure of which is a view in perspective and partly in cross-section of a conduit such as an automobile exhaust duct of muffler made in accordance with the present invention.

Referring now to the drawing which illustrates one embodiment of the invention, there is shown a conduit comprising a composite hollow tubular structure having an inner portion of inorganic fibrous material such as asbestos filled with ceramified silicone resin indicated by the layer 11 and an outer portion of inorganic fibrous material filled with unceramified silicone resin indicated by the layer 12. Surrounding the composite structure there may be provided a protective jacket 13 of silicone rubber or other heat resistant material.

The structure shown in the drawing is preferably made by impregnating tubular fibrous interlayer material with silicone resin and converting the inner portion of the resin to ceramic by passing hot gases through the tube. The protective jacket may be applied by extrusion over the resin-fiber composite or by mandrel wrapping or by any other means common in the art. This may be accomplished either before or after ceramification of the inner portion of the tubular composite.

The inorganic fiber may be any fiber capable of withstanding without appreciable deterioration the temperature of silicone resin ceramification and of the high temperature fluids which are to be passed through the conduit in use. Suitable materials besides asbestos include glass fibers, silica fibers, alumina, silicon carbide, Fiberfrax, silicon nitride, boron nitride, boron, and various other metal carbides, silicates and metals available in fibrous form. The fibers may be braided, woven, molded or in matt form. The specific type of fiber used and the thickness of the fibrous layer is governed by the thermal coefficient of the material, the temperature of the fluids to be passed through the conduit and the allowable external temperature of the conduit. These are necessarily matters of design within the skill of those versed in the art.

The silicone resin impregnant may contain any organosiloxane in which the substituent groups are hydrogen atoms or organic radicals attached to the silicon through silicon-carbon bonds which organic radicals are composed of carbon, hydrogen, oxygen, or nitrogen atoms and which contain not more than a total of 18 carbon, oxygen or nitrogen atoms per radical. The term "siloxane" as used herein means that the material contains at least one SiOSi linkage per molecule. This, therefore, includes incompletely hydrolyzed silanes. Numerous specific examples of these siloxanes are disclosed in U.S. Patent 3,090,691, granted May 21, 1963, to the present applicant. The resin does not necessarily have to be cross-linked in order to be operative. The quantity of resin in the composite can be varied from 2 to 60% by weight before ceramification and the residual silica can be between about 1 and 20 percent by weight after ceramification in the ceramified portion of the composite.

The 20 percent limitation on residual silica prevents the composite from becoming too brittle to allow bending without cracking of the ceramic material. Below 20 percent residual silica the fibrous nature of the composite apparently acts to allow bending without cracking. The silica acts as a bonding medium for the fibers and prevents their being eroded away in fluid streams passing through the conduit.

The jacket or outer covering may be any elastomeric or flexible material capable of withstanding the temperature at the surface of the composite. If high temperatures (up to about 500° F.) are encountered at the surface of the composite silicone rubber is a preferred material. For lower temperatures cheaper materials may be utilized. As an economy measure or for special environments, it is possible to provide multiple jackets, for example a silicone rubber layer may be covered with a neoprene layer to provide a protective coating.

In a particular embodiment of the invention a woven asbestos sleeve two inches in diameter and having a nominal wall thickness of 3/16 inch was impregnated with a phenylmethylsiloxane resin having an average of 1.05 total methyl and phenyl radicals per silicon to form a substantially void-free composite. The composite was jacketed with a nominal 1/8 inch of silicone rubber. Hot air at 1100° F. was passed through the tube for six hours. At the end of one hour the temperature at the silicone rubber-composite interface leveled out at about 500° F. with the outside surface of the silicone rubber at 320° F. and no further temperature rise was observed during the remainder of the 6 hour period. At the end of the six hour period, the conduit was still flexible enough to be bent, yet at the inside surface all that remained of the resin was residual silica binding the asbestos fibers. This ceramified material apparently acted as an excellent thermal insulation layer preventing heat transmission through the conduit wall.

The structure so formed is chemically inert with respect to automotive exhaust gases and water and is therefore not subject to corrosion when used in automotive exhaust systems. The elastomeric external covering provides additional protection against flying stones and other objects as well as providing extra thermal insulation and vibration damping. Since the conduit is sufficiently flexible to be bent to various configurations, it may be stored in straight lengths or coils and cut and bent to fit any particular exhaust installation as needed. This eliminates the present need for stocking different shaped exhaust conduits for virtually each different automobile model. It has further been found that some internal combustion engine exhaust gases are discharged at a sufficiently high temperature to cause ceramification of the interior portions of the composite conduit structure. It is therefore possible to save manufacturing cost and allow the conduit to be more easily bent for installation by mounting an unceramified conduit in place in an exhaust system and allowing the gases produced by the engine to produce the necessary ceramification.

It has also been found that the ceramic-fiber composite inner structure serves to muffle sound. Hence the construction may be used not only to conduct exhaust gases but also as a muffler. It is to be understood that for use as an automobile muffler and in other uses as well, the structure need not be circular in shape as shown and may include internal baffles or other structures without departing from the scope of the invention.

Various other modifications and variations of the present invention will become obvious to those skilled in the art. It is to be understood, therefore, that within the scope of the appended claims the invention may be practiced otherwise than as specifically described.

I claim:
1. A conduit for high temperature fluids comprising a tubular composite of inorganic fiber impregnated with a silicone resin, at least the innermost portion of the said silicone resin being ceramified, any unceramified portion of said silicone resin consisting of between 2 and 60 percent by weight of the inorganic fiber silicone resin composite in the unceramified portion, and the residual silica in the ceramified portion being between 1 and 20 percent by weight after ceramification.

2. A conduit as defined in claim 1 and further including a layer of elastomeric material over said tubular composite.

3. A conduit as defined in claim 2 wherein said elastomeric material is silicone rubber.

References Cited

UNITED STATES PATENTS

| | | | |
|---|---|---|---|
| 2,308,607 | 1/1943 | Jackson | 138—141 X |
| 2,525,070 | 10/1950 | Greenwald et al. | 138—145 X |
| 2,673,131 | 3/1954 | Kistler | 138—141 |
| 2,768,925 | 10/1956 | Fay. | |
| 2,854,031 | 9/1958 | Donaldson | 138—144 |
| 2,870,793 | 1/1959 | Bailey | 138—141 |
| 2,887,728 | 5/1959 | Usab. | |
| 2,930,082 | 3/1960 | Foss et al. | 138—145 |
| 2,932,597 | 4/1960 | St. John et al. | 138—145 X |
| 2,990,855 | 7/1961 | Sipler | 138—145 |
| 3,090,691 | 5/1963 | Weyer | 106—39 |
| 3,206,867 | 9/1965 | Ziegler | 34—22 |
| 3,233,699 | 2/1966 | Plummer | 138—141 X |

FOREIGN PATENTS 1,249,759  11/1960  France.

OTHER REFERENCES

Product Engineering, "New Extras in Arcosil Silicone Ducts, Sleeves, Couplings," August 1952, p. 354.

HOUSTON S. BELL, JR., *Primary Examiner.*

U.S. Cl. X.R.

138—145